INVENTOR
GERARD C. WOLTERS
BY Thomas A. Briody
HIS ATTORNEY

INVENTOR:
GERARD C. WOLTERS

BY Thomas A. Briody

HIS ATTORNEY 3,314,010

RAPID TRANSITION SQUELCH CIRCUIT

Gerard C. Wolters, Decatur, Ill., assignor to General Electric Company, a corporation of New York Filed Sept. 10, 1963, Ser. No. 307,839

4 Claims. (Cl. 325—348)

Figure 1:
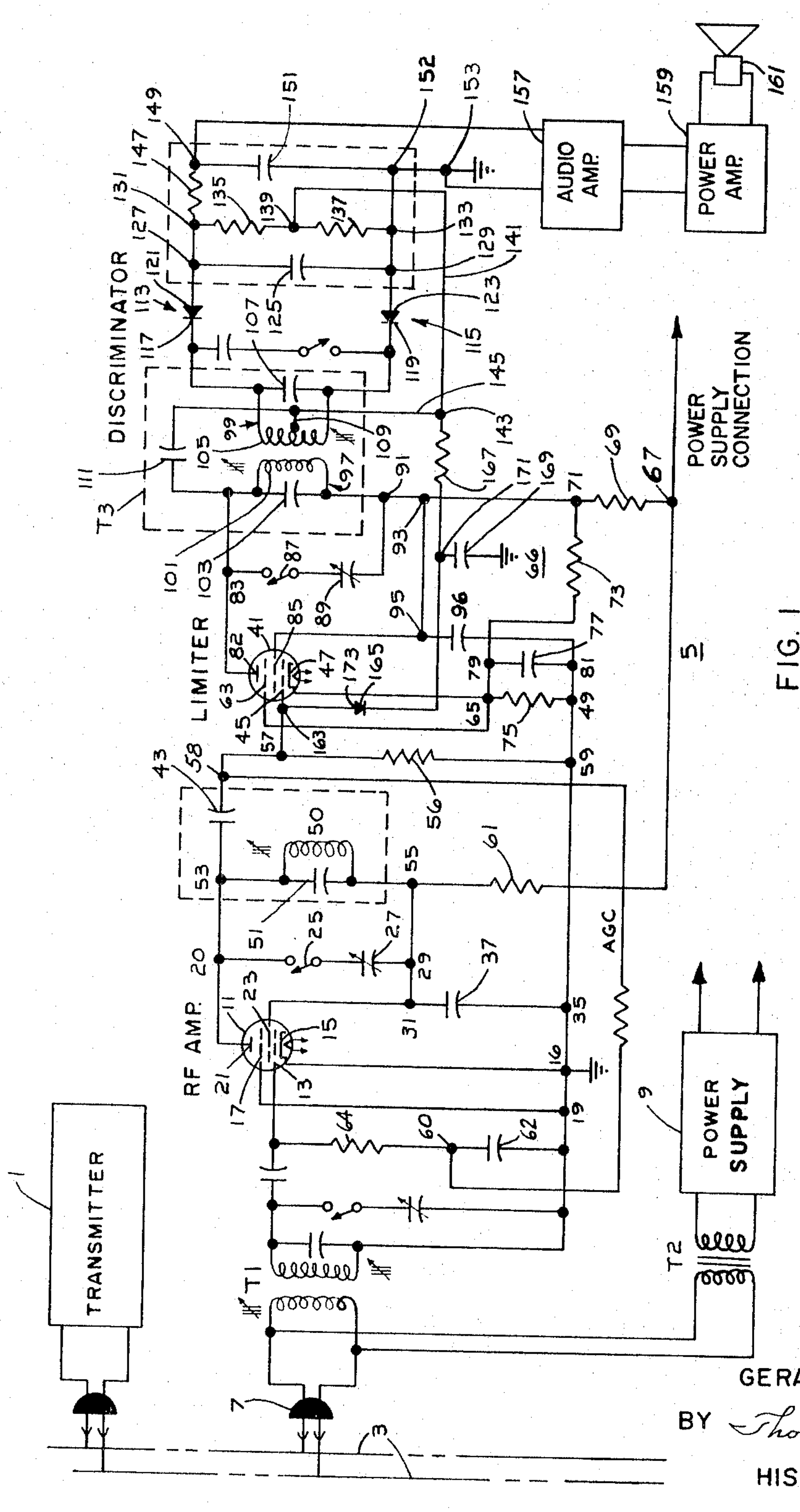

This invention relates to squelch circuits for radio receivers, and in particular to squelch circuitry for a frequency modulated receiver such as the type which receives its carrier current signal through house wiring.

It is known that frequency modulated RF carrier current may be transmitted through house wiring and received therefrom by a frequency modulated receiver which provides an audible reproduction of the desired information. In the absence of a transmitter carrier signal, such a receiver has been found to have a relatively high output noise level. In particular, because the transmission is by carrier current, the receiver is subject to various and sundry noise impulses impressed upon the A.C. line. The noise level of the receiver is further accentuated by the presence of an AGC circuit in the receiver, since the AGC circuit provides maximum gain in the absence of a carrier wave. For many applications of these receivers, the relatively high output noise level has been considered objectionable and undesirable by the operator.

Accordingly, it is an important object of the present invention to provide a new and improved squelch circuit which renders a receiver inoperative in the absence of a carrier wave.

It is another object of this invention to provide an automatic squelching circuit which is extremely efficient in operation and readily lends itself to use in a frequency modulated receiver.

Still another object of my invention is to provide for use in a frequency modulated receiver of a carrier current communications system, a novel squelching circuit which is low in cost and utilizes a minimum number of parts.

An additional object of my invention is to provide an improved squelching circuit for an amplifier, which circuit operates automatically and provides a very rapid transition between a muting condition and normal operation of an amplifier stage.

In carrying out my invention, in one form thereof, I provide a squelch circuit for muting a frequency modulated receiver during the absence of a transmitter carrier wave. This squelch circuit comprises the series arrangement of a clamping diode and an integrating capacitor which are connected between the grid of a limiter and ground, and a voltage divider network. The limiter is biased to cutoff by a cathode voltage derived from the voltage divider network.

When there is no carrier input signal present, and noise occurs, the diode clamps the noise pulse below the cutoff point of the limiter. The limiter is, therefore, nonconductive on noise bursts and the receiver is squelched.

When a carrier signal is imposed upon the limiter grid, a gradually increasing positive charge appears across the integrating capacitor. A positive feedback voltage source is also applied to the clamping diode, and this reinforces the positive charge on the integrating capacitor until it becomes great enough to bias the diode to cutoff. The limiter then operates between cutoff and saturation, and the receiver system "snaps" out of squelch. After that, the limiter stage functions with no influence from the squelch circuit because the clamping diode has reached cutoff.

Further aspects of my invention will become apparent hereinafter, and the specification concludes with claims particularly pointing out and distinctly claiming the subject matter which I regard as my invention. The invention, however, as to organization and method of operation, together with further objects and advantages thereof, may best be understood by reference to the following description when taken in conjunction with the accompanying drawings, in which:

FIG. 1 is a schematic representation of one form of the squelch circuit embodying the present invention.

Figure 2A:
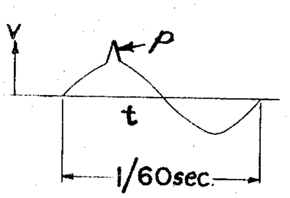

FIG. 2*a* is a plot showing a high amplitude noise pulse which might be present on an A.C. line voltage.

Figure 2B:
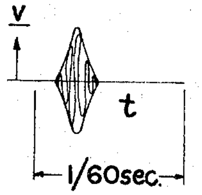

FIG. 2*b* is a plot showing a typical noise pulse after amplification through the tuned RF stage.

Figure 3:
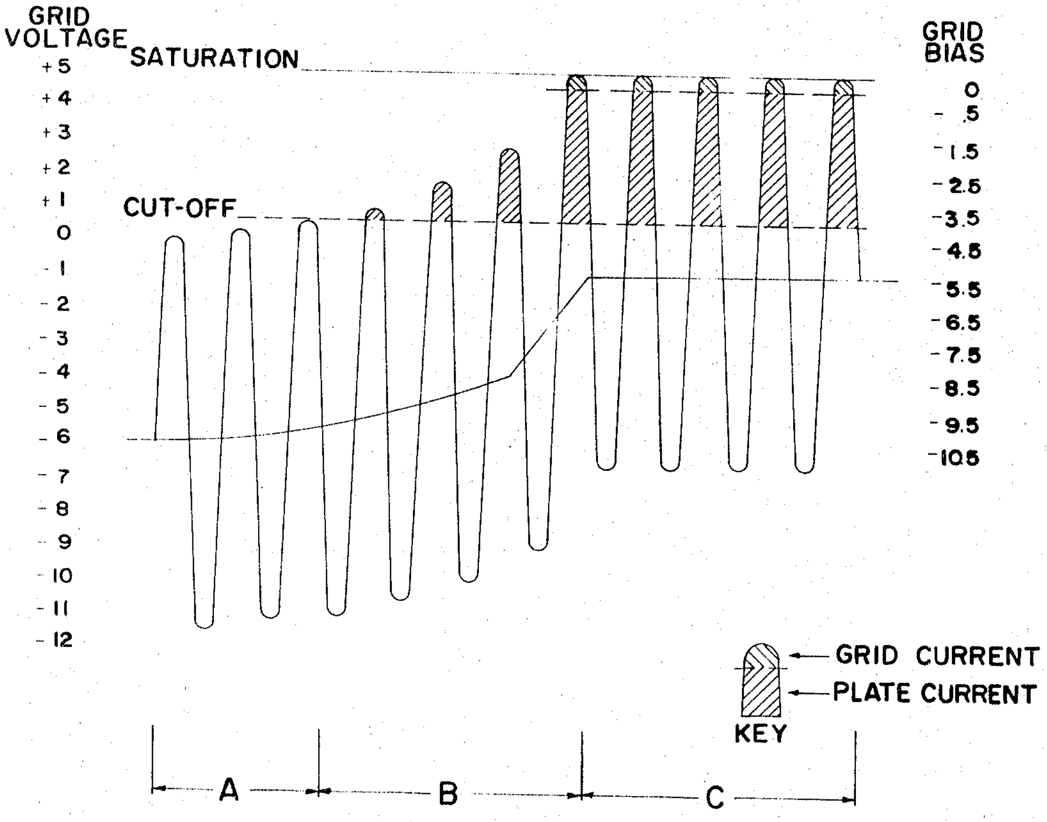

FIG. 3 shows a plot of limiter grid voltage waveform sufficient to cause limiting. The waveform is divided into three periods of time A, B, and C, to facilitate an analysis thereof.

Referring first to FIG. 1 of the accompanying drawings, there is shown a home music distribution system comprising a transmitter 1 which imparts a low harmonic content, frequency modulated RF carrier to the house wiring 3. The modulated RF carrier becomes superimposed upon the 60 cycle line frequency and is transmitted by the house wiring to the receiver 5, which converts the modulated carrier into an audible signal.

The receiver 5 is coupled to the house wiring through the use of a suitable plug 7, the plug 7 serving to couple the RF carrier signal through transformer T1 to the radio frequency amplifier stage of the receiver 5. The plug 7 also serves to connect the power supply transformer T2 to the line, the transformer T2 in conjunction with power supply 9 being provided to develop suitable D.C. operating voltages for the receiver.

The radio frequency amplifier stage of the receiver is conventional, and it includes a pentode amplifier tube 11, which has its control grid 13 connected to one side of the secondary of coupling transformer T1. The cathode 15 of tube 11 is connected to ground at point 16, and it is also connected to the other side of the secondary of the transformer T1 to form the input circuit for the RF amplifier stage. Suppressor 17 of tube 11 is connected to cathode 15 and grounded at point 19, in the usual fashion.

The output circuit of the RF amplifier stage is from plate 21 of tube 11 through point 53, tank circuit 50, 51 of an interstage tuning circuit, points 55, 31, bypassing capacitor 37 and grounded points 35, 16, to the cathode 15. Screen grid 23 is grounded by a connection to point 31. To provide a suitable D.C. power supply path for the plate circuit of the RF amplifier stage, resistor 61 is connected between points 67 and 55, which are suitably connected to power supply 9. For enabling the convenient selection of an alternate tuning frequency, a series connected variable capacitor 27 and switch 25 are connected in parallel with the tank circuit 50, 51, at points 20 and 29. A suitable alternate frequency selecting circuit is also provided for all the tuning circuits of the various receiver stages, although for convenience purposes, such a circuit is not shown in the primary of the transformer T1.

To help virtually eliminate any undesirable amplitude modulation of the carrier signals, a limiter stage is coupled to the output of the RF amplifier tube 11. In the illustrated receiver 5, the limiter stage includes a pentode amplifier tube 41.

More particularly, as shown in FIG. 1, the plate 21 of tube 11 is connected in series with coupling capacitor 43 and to control grid 45 of the limiter tube 41, to form one side of the input circuit for tube 41. The cathode 47 of the limiter tube 41 is connected to ground at point 49 to form the other side of the input circuit of tube 41. For coupling the RF stage to the limiter stage in receiver 5, the aforementioned interstage tuning circuit arrangement has been provided. This arrangement comprises the parallel combination of a coil 50 and capacitor 51 (i.e. a tank circuit) connected through point 53 and coupling capacitor 43 to control grid 45 of the limiter, and through bypassing capacitor 37 to ground point 35. The resistor 56 is also connected between the control grid 45 and ground, at points 57 and 59. Suppressor 63 of the limiter amplifier tube 41 is connected to cathode 47 at point 65.

It is important to note that the receiver 5 embodying the present invention, incorporates a very fast acting AGC circuit. For the illustrated receiver, this AGC circuit includes a connection between point 58 (which is connected to control grid 45 of the limiter tube) and point 60 (which is connected to the input of the RF amplifier tube 11), and a bypassing capacitor 62 which is connected between point 60 and ground. More particularly, as shown schematically in FIG. 1, resistor 64 and bypassing capacitor 62 are series connected between control grid 13 and ground in the input of the RF amplifier stage, and point 60 is located between resistor 64 and capacitor 62. The capacitor 62 is preferably of a relatively small capacitance (e.g. in the order of 100 mmf.). Because of the use of a bypassing capacitor of relatively small magnitude in the AGC circuit between the control grid 45 of the limiter tube and the control grid 13 of the RF amplifier tube 11, a relatively short time constant is provided which decreases amplitude modulation of the incoming carrier signal. Such a circuit arrangement helps to eliminate extraneous amplitude variations which might otherwise become audible as noise in the discriminator output.

To provide cathode voltage for the limiter tube 41, a voltage divider network 66 is connected to a D.C. power supply source at point 67. This voltage divider network includes resistor 69 connected at junction point 71 to resistor 73, resistor 73 connected to point 65, and cathode resistor 75 connected between point 65 (between the suppressor 63 and grid 47) and ground point 49. A cathode bypassing capacitor 77 is placed in parallel with the cathode resistor 75 at junctions 79, 81. The circuit arrangement for providing cathode voltage to limiter 41, including the voltage divider network 66, forms an important aspect of my invention, as shall become apparent hereinafter.

The output circuit of the limiter tube 41 is from plate 82 through point 83, the primary tank circuit 97 of transformer T3, points 91, 93 and 95, bypassing capacitor 96, point 81, bypassing capacitor 77 and points 79, 65, to the cathode 47. Screen grid 85 is grounded by a connection to point 95. For enabling the selection of the alternate tuning frequency, as previously intimated, switch 87 and variable capacitor 89 are connected between the plate 82 and the grounded side of tuned circuit 97, at points 83 and 91.

For coupling the output of the limiter stage of the receiver 5 to a discriminator stage, a conventional FM discriminator transformer T3 has been provided. Primary tank circuit 97 and secondary tank circuit 99 of the transformer T3 are tuned to the frequency of the incoming carrier signal and are inductively as well as capacitively coupled.

More specifically, as shown schematically in FIG. 1, the primary tank circuit 97 includes the parallel combination of coil 101 and capacitor 103 which are connected across plate 82 and ground point 93 at the output of the limiter tube 41. The secondary tank circuit 99 includes secondary coil 105 and capacitor 107 in parallel, with tap 109 of the secondary coil connected back to the plate side of the primary coil through capacitor 111.

Capacitor 111 connects the frequency modulated voltage from the primary coil 101 to the center of the secondary coil 105 and also blocks the D.C. plate voltage from a pair of matching diodes 113 and 115 which have their cathodes 117 and 119, respectively, directly connected in series with the secondary tank circuit 99. The anodes 121 and 123 of the diodes 113 and 115 are each connected to one side of capacitor 125, at points 127 and 129. From the points 127 and 129, the anodes 121 and 123 of the discriminator diodes are connected at points 131 and 133 to the outer ends of a pair of series connected and center tapped load resistors 135 and 137. The load resistors 135 and 137 are connected together in conventional fashion at point 139, and conductor 141 joins this terminal 139 to point 143, for connection back to tap 109 of the secondary coil by conductor 145.

The anode end of load resistor 135 is connected from point 131 to ground through resistor 147, output terminal 149, capacitor 151, and point 153. The purpose of this arrangement is to provide a de-emphasizing effect which compensates for pre-emphasis in the transmitted signal, and to also filter out RF carrier from the output of the discriminator.

The output terminals 149 and 153 of the discriminator stage are coupled to an audio amplifier 157, which is suitably coupled to a power amplifier 159. The output of the power amplifier 159 develops an amplified audio signal which is utilized to drive suitably connected loudspeaker 161.

As mentioned hereinbefore, the receiver 5 is designed for using house wiring as its transmission medium, and it also utilized an AGC circuit. Such a receiver 5 has a relatively high output noise level in the absence of a transmitter carrier signal, due in part to its subjection to noise impulses impressed upon the A.C. line, and accentuated by the presence of the AGC circuit.

To help mute the FM receiver 5 during the absence of a transmitter carrier wave and thereby obviate the deleterious effects incident to high output noise level, attention is now directed to the improved squelch circuitry of the present invention. This squelch circuitry has been found to operate in particularly advantageous fashion with a receiver of the general nature previously described.

As shown schematically in FIG. 1, between a terminal 163 at the control grid 45 of limiter tube 41, and terminal 143 of the discriminator, there is connected a clamping diode 165, a resistor 167 in series with diode 165, and a smoothing capacitor 169 which is grounded from point 171, located between the resistor 167 and diode 165. The diode 165 has its anode 173 located closest to the control grid 45 of the limiter, and is therefore adapted to conduct current away from the control grid 45. In addition, as previously mentioned, a voltage divider network 66 is connected to the D.C. power supply source at point 67, to provide a cathode voltage at point 65.

When the receiver 5 is placed in coupled engagement with the house wiring 4, if there is a no signal input condition, a signal of zero magnitude will appear at limiter grid 45. In the illustrated receiver, the limiter tube 41 may be biased to cutoff by means of a positive D.C. voltage of appropriate magnitude present at the cathode 47. This positive biasing voltage is derived from the voltage divider network 66 (which includes resistors 69, 73, 75 between the D.C. source and ground). The effect of this biasing voltage is to keep the limiter tube in a cutoff state during the absence of an RF carrier signal. Since the limiter tube 41 is at cutoff there will be no output, and therefore, the discriminator voltage output will be zero. For this condition, there will be no voltage present at smoothing capacitor 169. The AGC voltage at the input of the RF amplifier stage may be in the order of a fraction of volt due to contact potential developed at the control grid 13 of the RF amplifier tube 11.

When a noise pulse of relatively high amplitude is present on the A.C. line voltage of the house wiring 3 and there is no signal carrier input for the receiver, such a noise pulse may take the form of the spike $p$ of the voltage waveform shown in FIG. 2*a*. The receiver RF amplifier stage will not pass the 60 cycle A.C. line voltage, because the tuned RF stage is resonant at higher frequencies (such as, for example, 250 or 300 kc.). However, since noise pulses include high frequency components, a typical noise signal such as that illustrated in FIG. 2*b* will be present at limiter grid 45, after amplification by the RF stage.

For such a condition (i.e. with no carrier signal input and noise imposed on the A.C. line voltage), in accordance with the present invention, the diode 165 performs a clamping action and the smoothing capacitor 169 serves as an integrating device. Thus, the diode 165 will conduct for the positive half-cycle of the noise burst shown in FIG. 2*b*, thereby clamping the noise pulses below the cut-off point of the limiter tube 41. The value of the capacitor 169 is relatively large (e.g. .02 mf.) and since noise bursts generally occur in random short time durations, capacitor 169 is only slightly charged on each noise pulse. Between noise pulses, the capacitor 169 discharges through decoupling resistor 167 and load resistor 137. In view of the relatively short duration of the noise pulses, the averaging effect of capacitor 169, and the D.C. path to ground through resistors 167 and 137, the D.C. voltage across capacitor 169 remains at approximately zero so that the cathode of the diode 165 may be effectively considered as connected to ground.

For the noise and no carrier signal input condition, the noise voltage is effectively maintained below the cut-off point at the grid of the limiter stage so that the limiter tube 41 will not conduct on noise bursts and the receiver system is thereby muted or squelched.

When an RF carrier signal is imposed on the receiver, the resultant response of the squelching circuit may best be analyzed by a consideration of the limiter grid voltage waveform as a function of time. To facilitate such an illustrative consideration, for an unmodulated carrier signal applied to the limiter grid, there is graphically plotted in FIG. 3, the limiter grid voltage, grid bias, grid current, and plate current, for periods of time designated illustratively as A, B, and C.

During the period A shown in FIG. 3, the limiter stage is biased to cut-off by the appropriate D.C. grid bias (cathode voltage) e.g. —4.5 volts). For the first positive half-cycle, diode 165 conducts and charges the coupling capacitor 43 negative to establish an input signal A.C. zero axis potential of —6 volts on the limiter grid 45. The grid potential is, therefore, —6 volts and the grid bias is —10.5 volts. During the first half-cycle, a relatively small positive charge is also developed across capacitor 169 by conduction of diode 165. This positive voltage on the cathode of diode 165 sets up a bias to limit the conduction thereof. For the succeeding positive cycles during time period A, the positive charge across capacitor 169 gradually increases, but does not permit the positive peak voltages applied to the limiter grid to rise above the tube cut-off point. Accordingly, no signal is produced at the output of the limiter tube, and the limiter stage is effectively squelched.

For the first positive half-cycle during period B (FIG. 3) the peak grid voltage becomes such that the limiter tube 41 will conduct slightly and a small signal will thereupon appear in the discriminator output. This signal is indicated by the slanted lines directed from lower left to upper right of the positive half-cycles of the grid voltage waveforms of FIG. 3, which refer to plate current for the limiter. At this point in time, the capacitor 169 is not only charged more positive by conduction of clamping diode 165, but it is also charged by a small positive voltage developed across the discriminator load resistors 135 and 137. On the second and third cycles during time period B, the A.C. signal zero axis rises more steeply due to the progressively larger positive voltage fed back to the diode 165 from the discriminator load resistors. During the last cycle of period B, the positive charge appearing across capictor 169 becomes great enough to bias diode 165 to cut-off. The grid signal A.C. zero axis is thereupon sharply increased or "snapped" to a grid potential of —1 volt. The grid bias is then —5.5 volts and the limiter then operates between cut-off and saturation, with the limiter tube grid 45 drawing current during the approximately one-half volt positive peak of the applied signal. This grid current is indicated in the plot of FIG. 3 by slanted lines from lower right to upper left of the positive half cycles of the limiter grid voltage waveform. The sharp rise in the grid signal A.C. zero axis during the last cycle of period B represents the moment at which the circuit of receiver 5 "snaps" out of squelch.

For period C (of the plot in FIG. 3) the limiter stage functions with no influence from the squelch circuit, since the clamping diode 165 has reached cut-off.

For the descriptive analysis of the periods A, B, and C of the plots illustrated in FIG. 3, a carrier signal level of 12 volts peak to peak has been used to produce —1 volt AGC. It will be understood that if the signal input becomes greater, the limiter output would thereupon be controlled by the saturation and cut-off operating points. It is further noted that when the limiter input signal increases, coupling capacitor 43 will become progressively charged negative, thereby producing a greater negative voltage across grid resistor 56. This negative voltage across the grid resistor 56 is applied to the AGC circuit.

It will now, therefore, be understood that in accordance with the present invention I have provided an improved squelching circuit arrangement for a frequency modulated receiver. An important advantage and aspect of this circuit arrangement resides in the fact that the transition from "squelch" to normal operation, which has been optimally adjusted to occur at the lowest usable carrier level, is not a gradual transition, but a rapid or "snapping" type of transition. Such an effect is considered analogous to "switching" from one condition of operation to another, and it is due in part to positive D.C. feedback between the discriminator output and the control grid of the amplifier tube duing the transition period.

While in accordance with the patent statutes, I have described what at present is considered to be the preferred embodiment of my invention, it will be obvious to those skilled in the art that various changes and modifications may be made therein without departing from my invention, and I, therefore, aim in the following claims to cover all such equivalent variations as fall within the true spirit and scope of this invention.

What I claim as new and desire to secure by Letters Patent of the United States is:

1. In a squelch circuit for a receiver of carrier waves including at least one amplifier stage, an amplifier device, means for biasing said device to cut-off in the absence of a radio frequency carrier at the input of said receiver, means including the series combination of a diode and a capacitor connected to a control element of said device for clamping noise pulses received by said amplifier device below the cut-off point thereof in the absence of a radio frequency carrier at the receiver input, said diode and capacitor being connected and arranged so that a gradually increasing positive charge is developed across the capacitor for limiting the conduction of said diode during a first predetermined period after the application of a carrier signal at the receiver input, and means for increasing said positive charge further during a second predetermined period after application of a carrier signal until said diode becomes biased to effective cut-off.

2. In a squelch circuit for a receiver of carrier waves including at least one amplifier stage, an amplifier device, means for biasing said device to cut-off in the absence of a radio frequency carrier at the input of said receiver, means including the series combination of a diode and a capacitor connected between a control element of said device and ground for clamping noise pulses received by said device below the cut-off point thereof in the absence of a radio frequency carrier at the receiver input, said diode and capacitor being connected and arranged so that a gradually increasing positive charge is developed across the capacitor for limiting the conduction of said diode during a first predetermined period after the application of a carrier signal at the receiver input, and means including positive feedback for rapidly increasing said positive charge on said capacitor further during a second predetermined period after application of a carrier signal until said diode becomes biased to effective cut-off and thereupon ceases to effect the normal operation of said amplifier device.

3. In a squelch circuit for a receiver of carrier waves including at least one amplifier stage, an amplifier device, circuit means including a voltage dividing network for biasing said device to cut-off in the absence of a radio frequency carrier at the input of said receiver, means including the series combination of a diode and a smoothing capacitor connected to a control element of said device for clamping noise pulses received by said device below the cut-off point thereof in the absence of a radio frequency carrier at the receiver input, thereby to provide squelching action for said receiver, said diode and capacitor being connected to said control element and to each other so that said capacitor functions as an integrator and a gradually increasing positive charge is developed across the capacitor for limiting the conduction of said diode during a first predetermined period after the application of a carrier signal at the input of said amplifier stage, and positive feedback means connected to said smoothing capacitor and said diode to accelerate the gradual increasing of the positive charge on said smoothing capacitor during a second predetermined period after application of said carrier signal until said diode becomes biased to effective cut-off and rapidly ceases to effect the normal operation of said amplifier device.

4. A frequency modulated receiver of carrier waves including a radio frequency amplifier stage, a limiter stage, and a discriminator stage, said radio frequency amplifier and limiter stages each including an amplifier device having a control element connected to the input circuit of the associated stage, an AGC circuit connected between the control element of the amplifier device of said limiter stage and the control element of the amplifier device of said radio frequency stage, said AGC circuit including a bypassing capacitor and resistor having a relatively short time constant thereby to decrease amplitude modulation of the incoming carrier signal in the audio frequency range, circuit means including a voltage dividing network for biasing said limiter amplifier device to cut-off in the absence of a radio frequency carrier at the input of said receiver, circuit means including the series combination of a diode and a smoothing capacitor connected to the control element of said limiter device for clamping noise pulses received by said limiter device below the cut-off point thereof in the absence of a radio frequency carrier at the receiver input, thereby to provide squelching action for said receiver, said diode and smoothing capacitor being connected to said control element and to each other so that said capacitor functions as an integrator and a gradually increasing positive charge is developed across the capacitor for limiting the conduction of said diode during a first predetermined period after the application of a carrier signal at the input of said limiter stage, and positive feedback means including load resistors of said discriminator stage connected to said smoothing capacitor and said diode to rapidly accelerate the gradual increasing of the positive charge on said smoothing capacitor during a second predetermined period after application of said carrier signal until said diode becomes biased to effective cutoff and rapidly ceases to effect the normal operation of said limiter stage.

No references cited.

KATHLEEN H. CLAFFY, *Primary Examiner.*

R. LINN, *Assistant Examiner.*